(12) United States Patent  (10) Patent No.: US 6,561,577 B2
Kelly  (45) Date of Patent: May 13, 2003

(54) INFANT SEAT WITH ADJUSTABLE HANDLE

(75) Inventor: Joseph E. Kelly, Mason, OH (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/951,311

(22) Filed: Sep. 13, 2001

(65) Prior Publication Data

US 2002/0033621 A1 Mar. 21, 2002

Related U.S. Application Data

(60) Provisional application No. 60/233,857, filed on Sep. 20, 2000.

(51) Int. Cl.[7] ............................................... A47D 13/02
(52) U.S. Cl. ................................. 297/183.2; 297/183.4
(58) Field of Search .......................... 297/250.1, 183.2, 297/183.3, 183.4, 183.5, 184.13; 16/321, 324, 326, 334

(56) References Cited

U.S. PATENT DOCUMENTS

| 4,087,885 A | * | 5/1978 | Gillentine ................... 16/325 |
| 4,186,905 A | * | 2/1980 | Brudy ......................... 16/321 |
| 4,634,175 A |   | 1/1987 | Wise |
| 4,666,327 A | * | 5/1987 | Su ............................... 16/324 |
| 4,986,599 A |   | 1/1991 | Wise |
| 5,011,221 A |   | 4/1991 | Wise |
| 5,143,419 A |   | 9/1992 | Tepper et al. |
| 5,244,292 A |   | 9/1993 | Wise |
| 5,522,639 A |   | 6/1996 | Jaime |
| 5,542,151 A | * | 8/1996 | Stranski et al. ............... 16/326 |
| 5,575,530 A |   | 11/1996 | Harper et al. |
| 5,658,044 A |   | 8/1997 | Krevh |
| 5,775,770 A |   | 7/1998 | Tunney |
| 5,863,097 A | * | 1/1999 | Harper et al. ............ 297/183.2 |
| 5,971,476 A |   | 10/1999 | Gibson et al. |
| 5,997,086 A |   | 12/1999 | Gibson et al. |
| 6,017,088 A |   | 1/2000 | Stephens et al. |
| 6,145,927 A | * | 11/2000 | Lo ........................... 297/183.3 |

* cited by examiner

Primary Examiner—Peter M. Cuomo
Assistant Examiner—Stephen D'Adamo
(74) Attorney, Agent, or Firm—Thompson Hine LLP

(57) ABSTRACT

An infant seat (which is also called an infant carrier) includes a shell, a handle, and a spring. The handle has an arm hub coaxially aligned with, and rotatably attached to, a side hub of the shell. In one design, the side hub has notches, and the arm hub a projection. A spring has a longitudinal axis aligned substantially parallel to the hub axis and is positioned to radially bias the projection into engagement with a rotationally-aligned notch. The handle is movable in a direction substantially perpendicular to the hub axis to disengage the projection from the radially-aligned notch permitting the handle to be rotated to other notches corresponding to other handle positions. In another design, the arm hub has the notches, and the side hub has the projection.

11 Claims, 5 Drawing Sheets

INFANT SEAT WITH ADJUSTABLE HANDLE

CROSS REFERENCE TO RELATED APPLICATIONS

The present application claims priority of U.S. Provisional Application No. 60/233,857 filed Sep. 20, 2000, the entire disclosure of which is incorporated herein by reference.

BACKGROUND OF THE INVENTION

The present invention relates generally to infant seats (which are also called infant carriers), and more particularly to an infant seat which includes a shell and a rotationally adjustable handle.

Conventional infant seats include an infant seat having a shell and a handle attached to the shell. The shell defines a cavity for receiving an infant. The shell includes two sides each having a side hub. The handle has two arms, wherein each arm has an arm hub which is rotatably attached to a corresponding side hub. The side hub has a hub axis and has first and second radially-inwardly facing and circumferentially-spaced-apart first and second notches. The arm hub has a single projection which is engageable with a rotationally-aligned one of the two notches. A coil spring has a longitudinal axis which is aligned perpendicular to the hub axis and which is positioned to radially outwardly bias the projection into engagement with a rotationally-aligned one of the two notches. The handle is moveable with respect to the shell in a direction perpendicular to the hub axis to move the projection radially inward and therefore out of engagement with a rotationally-aligned first notch and thereafter the handle is rotatable with respect to the shell to rotationally move the first projection into rotational alignment with the second notch whereafter the spring radially-outwardly biases the projection into engagement with the second notch. The first notch, when engaged by the first projection, aligns the handle in a substantially upright carry position. Thereafter, pushing down on the handle will release the engagement of the projection in the first notch permitting the handle to be rotated to the second notch which aligns the handle in an inclined storage position.

What is needed is an infant seat having a more robust and more convenient design for the attachment of the handle to the shell which permits the handle to be unlocked from one handle position and then rotated and locked to a different handle position.

SUMMARY OF THE INVENTION

A first expression of a preferred embodiment of the invention is for an infant seat including a shell, a handle, and a first spring. The shell includes a first side with a first side hub having a first hub axis and having first, second, third, and fourth notches. The first and second notches each have an opening facing substantially radially inward toward the first hub axis, and the third and fourth notches each have an opening facing substantially radially outward away from the first hub axis. The handle includes a first arm with a first arm hub which has a first projection and a second projection and which is substantially coaxially aligned with, and rotatably attached to, the first side hub. The second projection is rotationally aligned with the third notch when the first projection is rotationally aligned with the first notch, and the second projection is rotationally aligned with the fourth notch when the first projection is rotationally aligned with the second notch. The first spring has a longitudinal axis which is aligned substantially parallel to the first hub axis. The first spring is positioned to simultaneously radially-outwardly bias the first projection into engagement with a rotationally-aligned first notch and radially-inwardly bias the second projection into engagement with a rotationally-aligned third notch. The handle is movable with respect to the shell in a direction substantially perpendicular to the first hub axis to simultaneously radially-inwardly move the first projection out of engagement with the rotationally-aligned first notch and radially-outwardly move the second projection out of engagement with the rotationally-aligned third notch. Thereafter, the handle is rotatable with respect to the shell to simultaneously rotationally move the first projection into rotational alignment with the second notch and the second projection into rotational alignment with the fourth notch, whereafter the first spring simultaneously radially-outwardly biases the first projection into engagement with the second notch and radially-inwardly biases the second projection into engagement with the fourth notch. Preferably, the third notch is substantially diametrically opposed to the first notch, the fourth notch is substantially diametrically opposed to the second notch, and the second projection is substantially diametrically opposed to the first projection. Preferably, the first notch, when engaged by the first projection, and the third notch, when engaged by the second projection, aligns the handle in a substantially upright carry position, and wherein the spring is a torsion spring which is torsionally biased to simultaneously urge the first projection to rotate away from the second notch and toward the first notch and the second projection to rotate away from the fourth notch and toward the third notch.

A second expression of a preferred embodiment of the invention is for an infant seat. The second expression is identical to the previously-described first expression except for the description of the location of the notches and projections and except for describing the first spring bias and the handle movement. In the second expression, one of the first side and arm hubs has the first, second, third, and fourth notches, and the other of the first side and arm hubs has the first and second projections. In the second expression, the first spring biases into engagement, and the handle can move out of engagement, the rotationally-aligned projections and notches meaning the first spring biases the projections into engagement with the notches and the handle can move the projections out of engagement with the notches, or the first spring can bias the notches into engagement with the projections and the handle can move the notches out of engagement with the projections.

A third expression of a preferred embodiment of the invention is for an infant seat. The third expression is identical to the previously-described first expression except that the third and fourth notches and the second projection described in the previously-described first expression have been omitted, except that the limitation on the first and second notches to have openings facing substantially radially inward has been omitted, and except for the limitation of "outwardly" or "inwardly" when describing "radially" has been omitted. In the third expression, the first and second notches both face substantially radially inward or both face substantially radially outward.

A fourth expression of a preferred embodiment of the invention is for an infant seat. The fourth expression is identical to the previously-described third expression except for the description of the location of the notches and projection and except for describing the first spring bias and the handle movement. In the second expression, one of the first side and arm hubs has the first and second notches, and the other of the first side and arm hubs has the first projection. In the second expression, the first spring biases into engagement, and the handle can move out of engagement, the rotationally-aligned projection and notches meaning the first spring biases the projection into engagement with the notches and the handle can move the projection out of engagement with the notches, or the first spring can bias the notches into engagement with the projection and the handle can move the notches out of engagement with the projection.

Several benefits and advantages are derived from the invention. The alignment of the longitudinal axis of the first spring of the preferred embodiment of the invention substantially parallel to the first hub axis allows two projections to be used to engage two diametrically opposing notches to provide a more robust locking mechanism for each handle position compared to the prior art which employed, in generally the same space, a single projection engaging a single notch for each handle position. Also, the first spring of the preferred embodiment of the invention preferably is a torsion spring which is torsionally biased to conveniently urge the handle to rotate to the upright carry position when the projections are disengaged from those notches corresponding to other handle positions.

DETAILED DESCRIPTION

Figure 1:
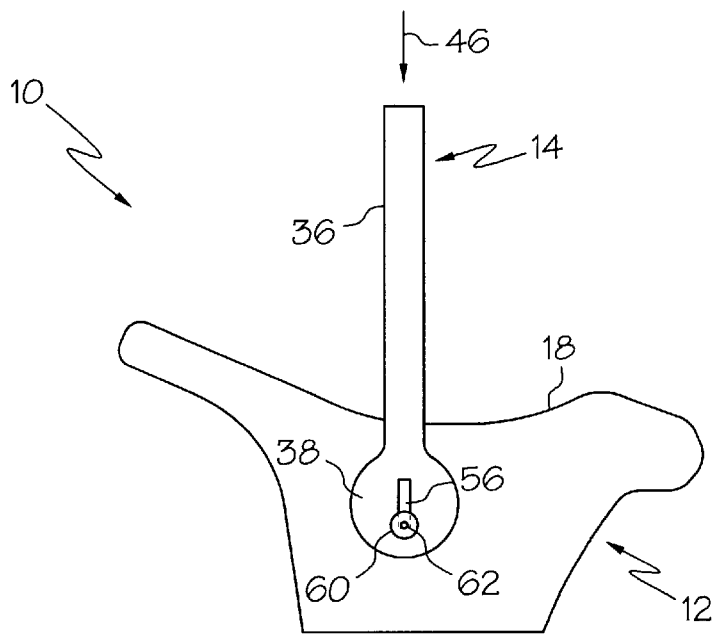
FIG. 1 is a schematic, side elevational view of a preferred embodiment of an infant seat of the invention including a handle attached to a shell, wherein the handle is shown in the upright carry position, and wherein cushion pads have been omitted for clarity.

A preferred embodiment of the invention is for an infant seat 10 and is shown in FIGS. 1–10 with the cushion pad and child harness straps removed for clarity as the cushion pad and child harness straps of the infant seat 10 do not constitute a part of the invention. Infant seats are also known as infant carriers. The terminology "infant seat" includes, without limitation, infant seats, with or without a base (not shown), which are adapted for installation in a vehicle, which are adapted for installation in a stroller, and which are used by themselves to hold an infant while the infant seat is placed on, for example, a table or lawn or is being carried about.

In a first expression of the preferred embodiment of the invention shown in the figures, the infant car seat 10 includes a shell 12, a handle 14, and a first spring 16. The shell 12 includes a first side 18 with a first side hub 20 having a first hub axis 22 and having first, second, third, and fourth notches 24, 26, 28, and 30, wherein the first and second notches 24 and 26 each have an opening 32 facing substantially radially inward toward the first hub axis 22, and wherein the third and fourth notches 28 and 30 each have an opening 34 facing substantially radially outward away from the first hub axis 22. The handle 14 includes a first arm 36 with a first arm hub 38 which has a first projection 40 and a second projection 42 and which is substantially coaxially aligned with, and rotatably attached to, the first side hub 20. The second projection 42 is rotationally aligned with the third notch 28 when the first projection 40 is rotationally aligned with the first notch 24, and the second projection 42 is rotationally aligned with the fourth notch 30 when the first projection 40 is rotationally aligned with the second notch 26. The first 5 spring 16 has a longitudinal axis 44 which is aligned substantially parallel to the first hub axis 22. The first spring 16 is disposed to simultaneously radially-outwardly bias the first projection 40 into engagement with a rotationally-aligned first notch 24 and radially-inwardly bias the second projection 42 into engagement with a rotationally-aligned third notch 28. The handle 14 is movable with respect to the shell 12 in a direction 46 substantially perpendicular to the first hub axis 22 to simultaneously radially-inwardly move the first projection 40 out of engagement with the rotationally-aligned first notch 24 and radially-outwardly move the second projection 42 out of engagement with the rotationally-aligned third notch 28 and thereafter the handle 14 is rotatable with respect to the shell 12 about the first hub axis 22 to simultaneously rotationally move the first projection 40 into rotational alignment with the second notch 26 and the second projection 42 into rotational alignment with the fourth notch 30 whereafter the first spring 16 simultaneously radially-outwardly biases the first projection 40 into engagement with the second notch 26 and radially-inwardly biases the second projection 42 into engagement with the fourth notch 30.

In a preferred construction, the third notch 28 is substantially diametrically opposed to the first notch 24, the fourth notch 30 is substantially diametrically opposed to the second notch 26, and the second projection 42 is substantially diametrically opposed to the first projection 40. In a preferred design, the first notch 24, when engaged by the first projection 40, and the third notch 28, when engaged by the second projection 42, align the handle 14 in a substantially upright carry position (as shown in FIG. 1). Here, the first spring 16 is a torsion spring which is torsionally biased to simultaneously urge the first projection 40 to rotate away from the second notch 26 and toward the first notch 24 and the second projection 42 to rotate away from the fourth notch 30 and toward the third notch 28. In this design, the first spring 16 has a first end 48 rotationally fixed to the first side hub 20 (such as being positioned in a hole 50 in the first side hub 20) and has a second end 52 rotationally fixed to the first arm hub 38 (such as being attached to a flange 54 on the first arm hub 38. Preferably, the longitudinal axis 44 of the first spring 16 is substantially coaxially aligned with the first hub axis 22.

In one design, the first arm hub 38 includes an elongated slot 56, the first side hub 20 includes a threaded hole 58 coaxially aligned with the first hub axis 22, and the infant seat 10 includes a washer 60 and a screw 62 which provide for rotational attachment of the first arm hub 38 to the first side hub 20 while allowing the handle 14 to be moved in the direction 46 which is substantially perpendicular to the first hub axis 22. The screw 62 passes through the slot 56, the washer 60 loosely retains the first arm hub 38 of the handle 14 to the shell 12, and the handle 14 can be pushed with respect to the shell 12 along direction 46 whereby the slot 56 moves past the washer 60 and screw 62 from a first position with the bottom of the slot 56 near the screw 62 to a second position with the top of the slot 56 near the screw 62, and that in the second position the handle 12 (along with its first arm hub 38 and slot 56) can be rotated with respect to the shell 12 (and its first side hub 20). In this design, the first spring 16 surrounds a spring support projection 64 of the first side hub 20. It is noted that the first spring 16 is not limited to a coil spring, and can be any spring, such as, without limitation, a leaf spring, as long as the spring as a longitudinal axis which is aligned substantially parallel to the first hub axis 22. Preferably, the first arm hub 38 includes a detachable cover (not shown) which allows easier installation of the first spring 16 and which includes the flange 54 and the slot 56. In one choice of materials, the shell 12 and the handle 14 comprise plastic, such as polypropylene, the first spring 16 comprises spring steel, and the washer 60 and the screw 62 comprise metal. Typically, the shell 12 also includes a second side hub 66, the handle 14 also includes a second arm hub 68, and the infant seat 10 also includes a second spring (not shown). Although only two handle positions are provided for in the preferred embodiment of the infant seat 10 shown in the figures, preferably the infant seat 10 is provided with additional handle positions by adding additional notches, as can be appreciated by the artisan. A feeding handle position (not shown) can be provided which places the handle 14 against a flat surface, such as a table, which is supporting the shell 12, wherein the feeding handle position provides greater stability for the infant seat 10 on the table. The feeding handle position is in addition to the handle positions corresponding the upright carry position (see FIG. 1) and the driving position (see FIG. 3).

Figure 2:
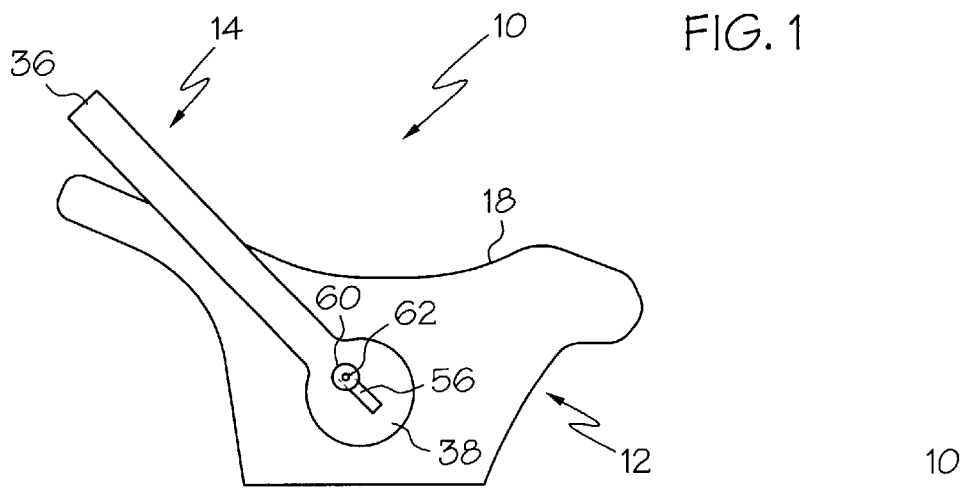
FIG. 2 is a view as in FIG. 1, but with the handle shown between the upright carry position and a driving position wherein the infant seat is to be installed in a vehicle.
Figure 3:
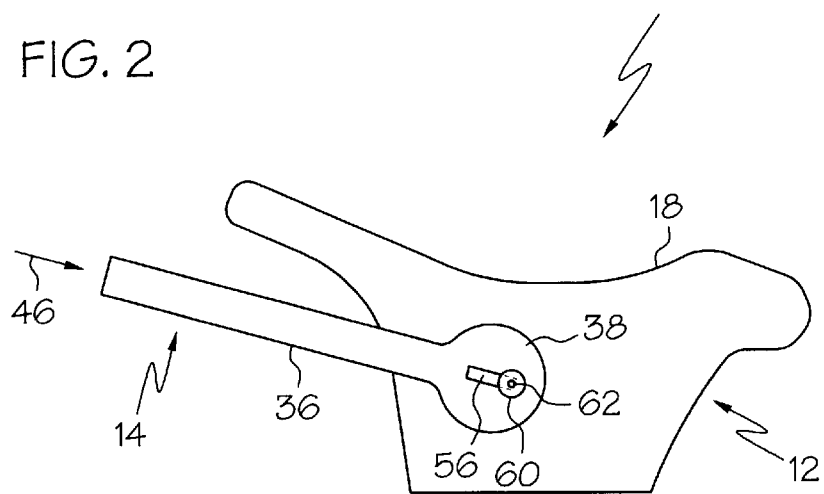
FIG. 3 is a view as in FIG. 1, but with the handle shown in the driving position.
Figure 4:
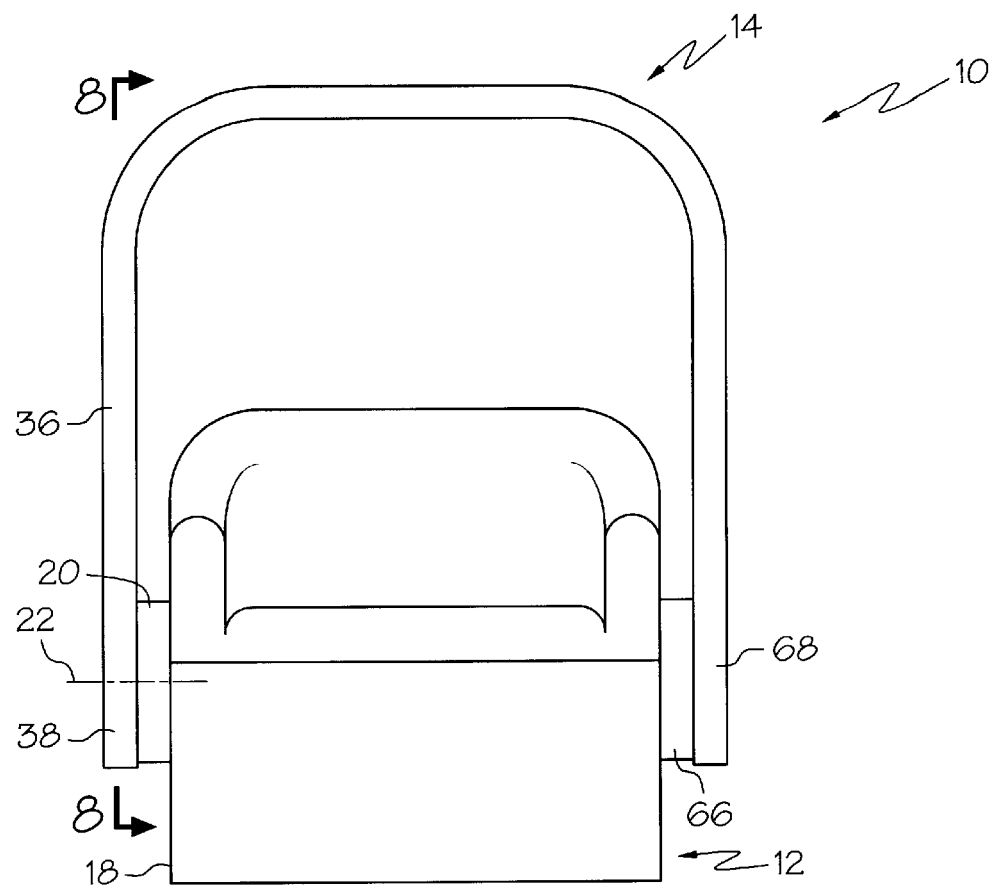
FIG. 4 is a schematic, front elevational view of the infant seat of FIG. 1 showing the first and second side hubs of the shell and the first and second arms of the handle.
Figure 5:
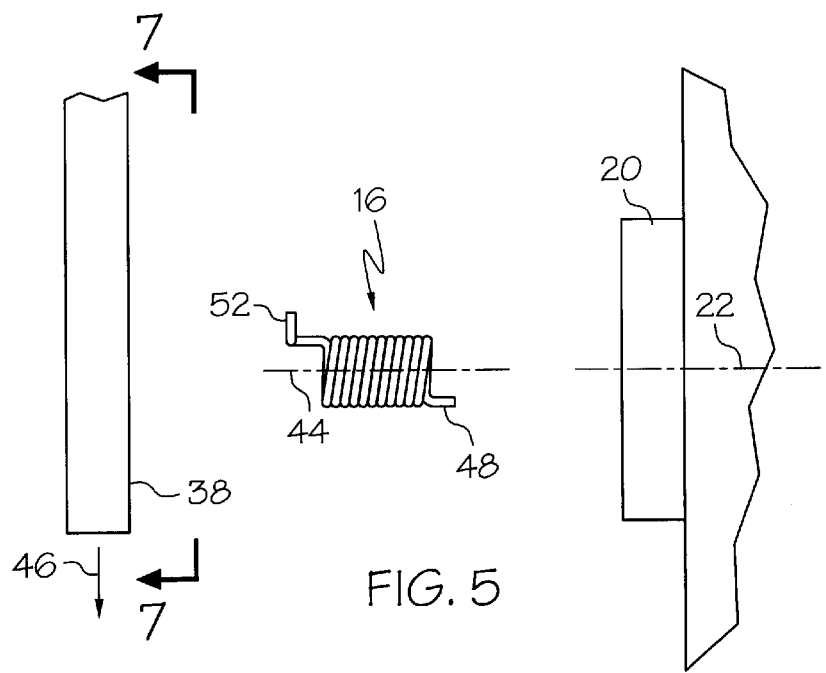
FIG. 5 is a schematic, front elevational exploded view of the first arm hub, first spring, and first side hub portion of the infant seat of FIG. 1.
Figure 6:
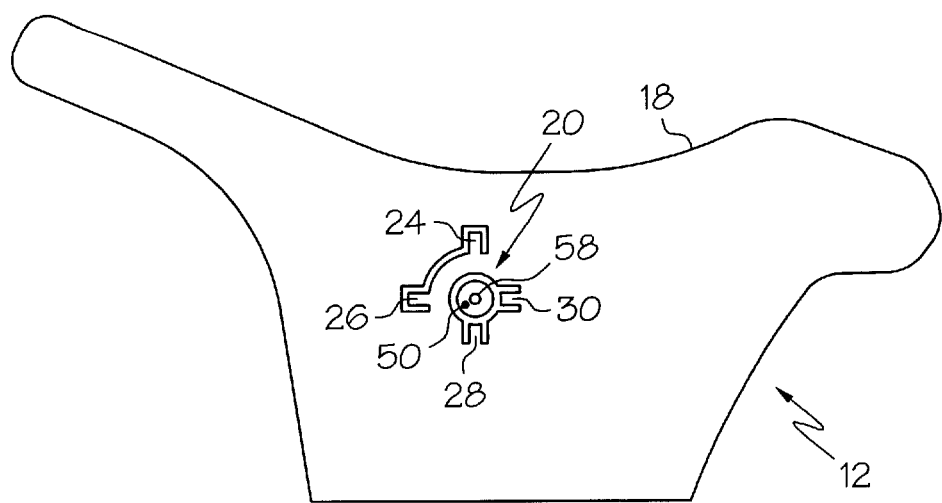
FIG. 6 is a schematic, side elevational view of the shell of the infant seat of FIG. 1.
Figure 7:
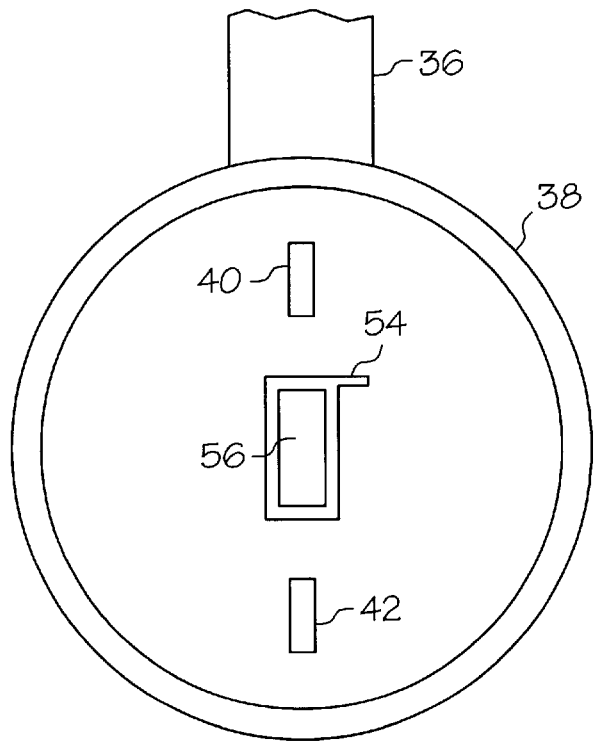
FIG. 7 is a schematic, side elevational view taken along lines 7—7 of FIG. 5 showing the first arm hub and a portion of the surrounding area of the first arm of the handle.
Figure 8:
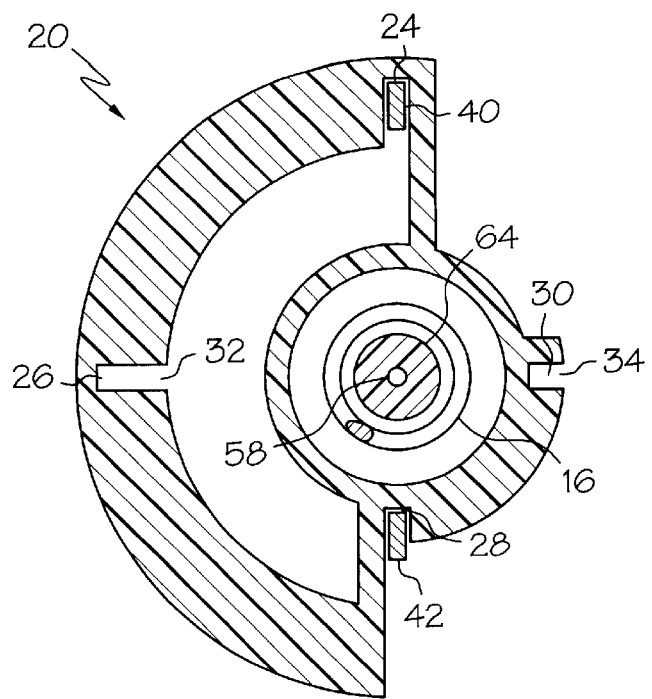
FIG. 8 is a more detailed, diagrammatic, cross-sectional view taken along lines 8—8 of FIG. 4 and corresponding to the handle position of FIG. 1, but showing the first spring, only the first and second projections of the first arm hub of the first arm of the handle, and only the first side hub of the first side of the shell, with other portions of the handle and shell being omitted for clarity.
Figure 9:
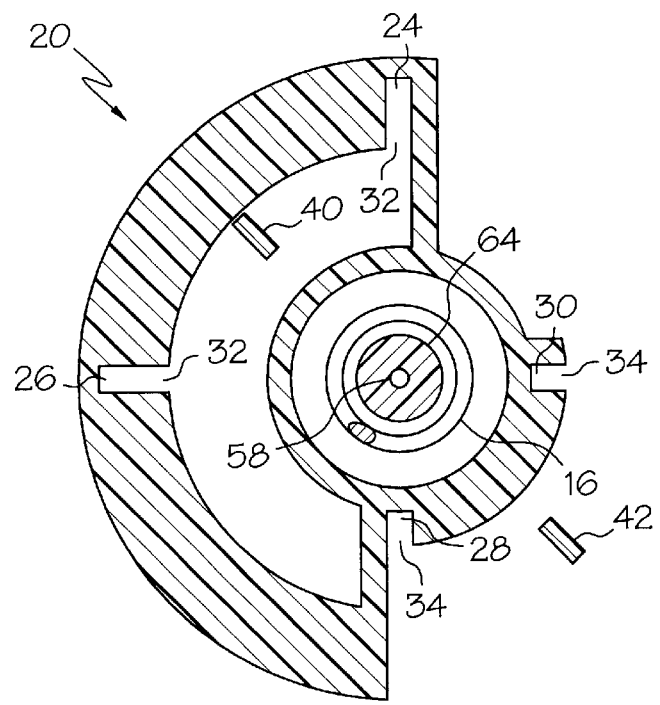
FIG. 9 is a view, as in FIG. 8, but corresponding to the handle position of FIG. 2.
Figure 10:
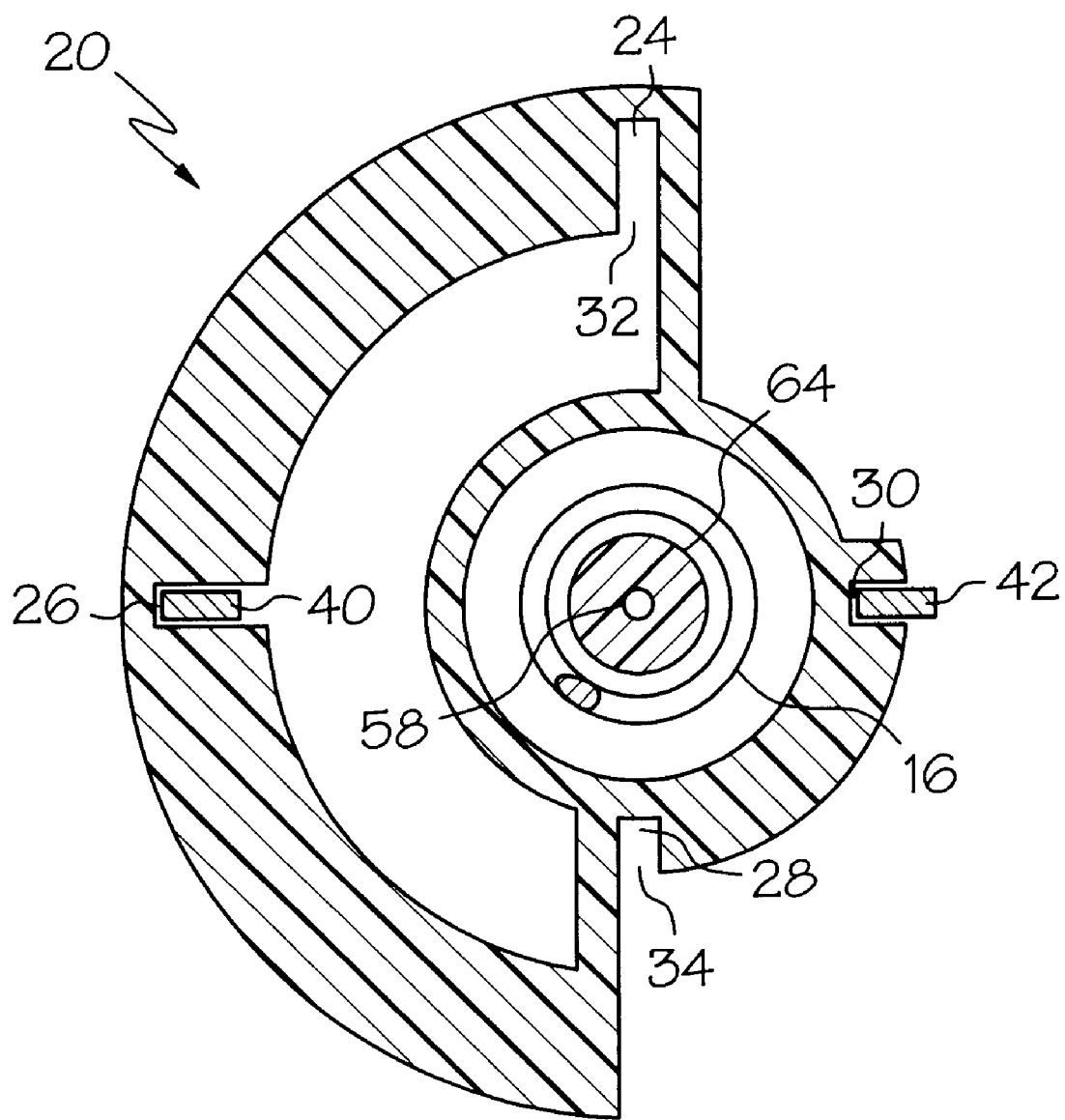
FIG. 10 is a view, as in FIG. 8, but corresponding to the handle position of FIG. 3.

In operation, the infant seat 10, with an infant positioned (or not) in the shell 12 (the cushion pad for which is not shown), is carried by the handle 14 in the upright carry position shown in FIG. 1. In this locked handle position, the first and second projections 40 and 42 are biased by a transverse component of the spring force of the first spring 16, which is exerted substantially perpendicular to the first hub axis 22 and in a direction opposite to the direction 46, to radially-outwardly move the first projection 40 of the first arm hub 38 into the opening 32 of the first notch 24 and to simultaneously radially-inwardly move the second projection 42 of the first arm hub 38 into the opening 34 of the third notch 28. The engagement of the first and second projections 40 and 42 in the first and third notches 24 and 28 is shown in FIG. 8. The infant seat is then placed in a vehicle (not shown). Thereafter, the handle 14 is moved downward along the direction 46 shown in FIG. 1 overcoming the transverse spring bias to disengage the first and second projections 40 and 42 from the first and third notches 24 and 28. As previously noted, the screw 62 passes through the slot 56, the washer 60 loosely retains the first arm hub 38 of the handle 14 to the shell 12, and the handle 14 can be pushed with respect to the shell 12 along direction 46 whereby the slot 56 moves past the washer 60 and screw 62 from a first position with the bottom of the slot 56 near the screw 62 to a second position with the top of the slot 56 near the screw 62, and that in the second position the handle 12 (along with its first arm hub 38 and slot 56) can be rotated with respect to the shell 12 (and its first side hub 20). Then, the handle 14 is rotated, as shown in FIGS. 2 and 9 until the first projection 40 is rotationally aligned with the second notch 26, and the second projection 42 is rotationally aligned with the fourth notch 30, as shown in FIGS. 3 and 10. Then, the handle 14 is released, and the first projection 40 is biased by the transverse component of the spring force of the first spring 16 radially outward into engagement with the second notch 26, and the second projection 42 is simultaneously biased by the transverse component of the spring force of the first spring 16 radially inward into engagement with the fourth notch 30 as shown in FIGS. 3 and 10. When the first spring 16 is a torsion spring, its first end 48 disposed in the hole 50 of the first side hub 20 and its second end 52 is torsionally biased and disposed to engage the flange 54 of the first arm hub 38. In removing the infant seat 10 from the vehicle, when the handle 14 is moved along the direction 46 shown in FIG. 3, it is disengaged from the driving position of FIGS. 3 and 10, and a torsional component of the spring force of the torsion spring will urge (and a strong torsion spring will actually rotate) the handle 14 away from the driving position of FIGS. 3 and 10 and towards (and with a strong torsion spring actually to) the upright carry position of FIGS. 1 and 8. Thereafter, the transverse component of the spring force of the torsion spring will radially-outwardly move the first projection 40 into engagement with the first notch 24 and the second projection 42 into engagement with the third notch 28 locking the handle in the upright carry position of FIGS. 1 and 8.

In a second expression of the preferred embodiment of the invention shown in the figures, the infant car seat 10 is identical to the previously-described first expression except for the description of the location of the first, second, third, and fourth notches 24, 26, 28, and 30 and the first and second projections 40 and 42 and except for the describing the first spring bias and the handle movement. In the second expression, one of the first side and arm hubs 20 and 38 includes the first, second, third, and fourth notches 24, 26, 28, and 30, and the other of the first side and arm hubs 20 and 38 includes the first and second projections 40 and 42. Thus, the first side hub can have the notches and the first arm hub the projections, or the first side hub can have the projections and the first arm hub the notches. In the second expression, the first spring biases into engagement, and the handle can move out of engagement, the rotationally-aligned projections and notches meaning the first spring biases the projections into engagement with the notches and the handle can move the projections out of engagement with the notches, or the first spring can bias the notches into engagement with the projections and the handle can move the notches out of engagement with the projections.

In a third expression of the preferred embodiment of the invention shown in the figures, the infant car seat 10 is identical to the previously-described first expression except that the third and fourth notches 28 and 30 and the second projection 42 have been omitted, except that the limitation on the first and second notches to have openings facing substantially radially inward has been omitted, and except for the limitation of "outwardly" or "inwardly" when describing "radially" has been omitted. In the third expression, the first and second notches both face substantially radially inward or both face substantially radially outward. It is noted that the handle 14 is able to be locked in a rotational position on the shell 12 by having the first projection 40 locked in a radially-aligned one of the first and second notches 24 and 26 without the presence of the second projection 42 and the third and fourth notches 28 and 30. It is further noted that with only the first projection 40 present, the first spring 16, when it is a torsion spring, will still urge the handle 14 towards the upright carry position.

In a fourth expression of the preferred embodiment of the invention shown in the figures, the infant car seat 10 is identical to the previously-described third expression except for the description of the location of the first and second notches 24 and 26 and the first projection 40 and except for describing the first spring bias and the handle movement. In the second expression, one of the first side and arm hubs 20 and 38 has the first and second notches 24 and 26, and the other of the first side and arm hubs 20 and 38 has the first projection 40. In the second expression, the first spring biases into engagement, and the handle can move out of engagement, the rotationally-aligned projection and notches meaning the first spring biases the projection into engagement with the notches and the handle can move the projection out of engagement with the notches, or the first spring can bias the notches into engagement with the projection and the handle can move the notches out of engagement with the projection. It is noted that the handle 14 is able to be locked in a rotational position on the shell 12 by having the first projection 40 locked in a radially-aligned one of the first and second notches 24 and 26 without the presence of the second projection 42 and the third and fourth notches 28 and 30, whether the first side hub has the first and second notches and the first arm hub the first projection or whether the first side hub has the first projection and the first arm hub the first and second notches. It is further noted that with only the first projection 40 present on the first arm or side hub, the first spring 16, when it is a torsion spring, will still urge the handle towards the upright carry position.

Several benefits and advantages are derived from the invention. The alignment of the longitudinal axis of the first spring of the preferred embodiment of the invention substantially parallel to the first hub axis allows two projections to be used to engage two diametrically opposing notches to provide a more robust locking mechanism for each handle position compared to the prior art which employed, in generally the same space, a single projection engaging a single notch for each handle position. Also, the first spring of the preferred embodiment of the invention preferably is a torsion spring which is torsionally biased to conveniently urge the handle to rotate to the upright carry position when the projections are disengaged from those notches corresponding to other handle positions.

The foregoing description of several expressions of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. An infant seat comprising:
a) a shell including a first side with a first side hub having a first hub axis;
b) a handle including a first arm with a first arm hub which is substantially coaxially aligned with, and rotatably attached to, the first side hub, wherein one of the first side and arm hubs has first, second, third, and fourth notches, wherein the first and second notches each have an opening facing substantially radially inward toward the first hub axis, wherein the third and fourth notches each have an opening facing substantially radially outward away from the first hub axis, wherein the other of the shell and the handle has a first projection and a second projection, wherein the second projection is rotationally aligned with the third notch when the first projection is rotationally aligned with the first notch, and wherein the second projection is rotationally aligned with the fourth notch when the first projection is rotationally aligned with the second notch; and
c) a first spring having a longitudinal axis which is aligned substantially parallel to the first hub axis, wherein the first spring is disposed to simultaneously radially-outwardly bias into engagement the first projection and a rotationally-aligned first notch and radially-inwardly bias into engagement the second projection and a rotationally-aligned third notch, wherein the handle is movable with respect to the shell in a direction substantially perpendicular to the first hub axis to simultaneously radially-inwardly move out of engagement the first projection and the rotationally-aligned first notch and radially-outwardly move out of engagement the second projection and the rotationally-aligned third notch and thereafter the handle is rotatable with respect to the shell about the first hub axis to simultaneously rotationally move the first projection into rotational alignment with the second notch and the second projection into rotational alignment with the fourth notch whereafter the first spring simultaneously radially-outwardly biases into engagement the first projection and the second notch and radially-inwardly biases into engagement the second projection and the fourth notch.

2. The infant seat of claim 1, wherein the third notch is substantially diametrically opposed to the first notch, wherein the fourth notch is substantially diametrically opposed to the second notch, and wherein the second projection is substantially diametrically opposed to the first projection.

3. The infant seat of claim 1, wherein the first notch, when engaged by the first projection, and the third notch, when engaged by the second projection, align the handle in a substantially upright carry position, and wherein the first spring is a torsion spring which is torsionally biased to simultaneously urge the first projection to rotate away from the second notch and toward the first notch and the second projection to rotate away from the fourth notch and toward the third notch.

4. An infant seat comprising:
a) a shell including a first side with a first side hub having a first hub axis and having first, second, third, and fourth notches, wherein the first and second notches each have an opening facing substantially radially inward toward the first hub axis, and wherein the third and fourth notches each have an opening facing substantially radially outward away from the first hub axis;
b) a handle including a first arm with a first arm hub which has a first projection and a second projection and which is substantially coaxially aligned with, and rotatably attached to, the first side hub, wherein the second projection is rotationally aligned with the third notch when the first projection is rotationally aligned with the first notch, and wherein the second projection is rotationally aligned with the fourth notch when the first projection is rotationally aligned with the second notch; and c) a first spring having a longitudinal axis which is aligned substantially parallel to the first hub axis, wherein the first spring is disposed to simultaneously radially-outwardly bias the first projection into engagement with a rotationally-aligned first notch and radially-inwardly bias the second projection into engagement with a rotationally-aligned third notch, wherein the handle is movable with respect to the shell in a direction substantially perpendicular to the first hub axis to simultaneously radially-inwardly move the first projection out of engagement with the rotationally-aligned first notch and radially-outwardly move the second projection out of engagement with the rotationally-aligned third notch and thereafter the handle is rotatable with respect to the shell about the first hub axis to simultaneously rotationally move the first projection into rotational alignment with the second notch and the second projection into rotational alignment with the fourth notch whereafter the first spring simultaneously radially-outwardly biases the first projection into engagement with the second notch and radially-inwardly biases the second projection into engagement with the fourth notch.

5. The infant seat of claim 4, wherein the third notch is substantially diametrically opposed to the first notch, wherein the fourth notch is substantially diametrically opposed to the second notch, and wherein the second projection is substantially diametrically opposed to the first projection.

6. The infant seat of claim 5, wherein the first notch, when engaged by the first projection, and the third notch, when engaged by the second projection, align the handle in a substantially upright carry position, and wherein the first spring is a torsion spring which is torsionally biased to simultaneously urge the first projection to rotate away from the second notch and toward the first notch and the second projection to rotate away from the fourth notch and toward the third notch.

7. The infant seat of claim 6, wherein the first spring has a first end rotationally fixed to the first side hub and has a second end rotationally fixed to the first arm hub.

8. The infant seat of claim 7, wherein the longitudinal axis of the first spring is substantially coaxially aligned with the first hub axis.

9. The infant seat of claim 4, wherein the first notch, when engaged by the first projection, and the third notch, when engaged by the second projection, aligns the handle in a substantially upright carry position, and wherein the first spring is a torsion spring which is torsionally biased to simultaneously urge the first projection to rotate away from the second notch and toward the first notch and the second projection to rotate away from the fourth notch and toward the third notch.

10. The infant seat of claim 4, wherein the first spring has a first end rotationally fixed to the first side hub and has a second end rotationally fixed to the first arm hub.

11. The infant seat of claim 4, wherein the longitudinal axis of the first spring is substantially coaxially aligned with the first hub axis.

* * * * *